United States Patent [19]

Katagiri

[11] Patent Number: 4,997,356
[45] Date of Patent: Mar. 5, 1991

[54] MOLD FOR MANUFACTURING A SKIN COVERED FOAMED PLASTIC ARTICLE

[75] Inventor: Hiroyuki Katagiri, Ayase, Japan
[73] Assignee: Ikeda Bussan Co., Ltd., Kanagawa, Japan
[21] Appl. No.: 439,548
[22] Filed: Nov. 21, 1989
[30] Foreign Application Priority Data
Nov. 30, 1988 [JP] Japan .................. 63-303045
[51] Int. Cl.⁵ .................. B29C 45/14; B29C 39/10
[52] U.S. Cl. .................. 425/117; 249/64; 249/66.1; 249/124; 249/151; 249/184; 264/46.4; 425/577; 425/DIG. 11
[58] Field of Search .................. 425/4 R, 817 R, 117, 425/125, 577, DIG. 10; 264/46.4, 46.5, 46.6, 46.7; 249/63, 142, 151, 177, 183, 184, 178, 175, 124, 122, 64, 186, 178, 66.1

[56] References Cited

U.S. PATENT DOCUMENTS

| | | | |
|---|---|---|---|
| 4,420,447 | 12/1983 | Nakashima | 249/172 |
| 4,792,297 | 12/1988 | Wilson | 264/328.7 |
| 4,829,644 | 5/1989 | Ieondo et al. | 264/46.8 |

Primary Examiner—Jay H. Woo
Assistant Examiner—Khanh P. Nguyen
Attorney, Agent, or Firm—Weiser & Stapler

[57] ABSTRACT

A mold for manufacturing a skin covered foamed plastic article in which the middle mold is to be attached to the upper mold so as to eliminate the attaching and removing of the middle mold for every manufacturing cycle, without creating a danger of damaging the manufactured skin covered foamed plastic article in taking it out of the mold. The mold includes a middle mold to be attached to the upper mold such that when the upper mold is lifted upwards in order to be disassembled from the lower mold, the middle mold also moves upwards and the skin covered foamed plastic article is taken out from the lower mold by the upper mold and the middle mold; and a protrusion for making a hole in the skin covered foamed plastic article to be manufactured, to be attached to the molding surface of the lower mold, which is freely detachable from the lower mold such that when the upper mold is disassembled from the lower mold, the protrusion is taken off the lower mold along with the skin covered foamed plastic article.

7 Claims, 5 Drawing Sheets

MOLD FOR MANUFACTURING A SKIN COVERED FOAMED PLASTIC ARTICLE

BACKGROUND OF THE INVENTION

1. Field of the Invention

The present invention relates to a mold for manufacturing a skin covered foamed plastic article such as that to be utilized as an automobile seat.

2. Description of the Background Art

Skin covered foamed plastic articles are generally used for automobile seat cushions, seat backs, and head rests. Such a skin covered foamed plastic article is usually manufactured by using a mold having an upper mold and a lower mold, and in addition a middle mold to be placed between the upper mold and the lower mold may be used, if necessary.

In such a mold for manufacturing skin covered foamed plastic articles, liquid foam resin is poured over a skin cover laid over the lower mold, which will subsequently stiffen to become a pad member combined with the skin cover in a cavity formed inside the assembled lower mold and upper mold. There is also a type of a skin covered foamed plastic article which incorporates frames such as a seat frame and a head rest frame by placing the frames on the skin cover before the liquid foam resin is poured.

The middle mold is often employed for making a hollow region in the pad member by dispelling the liquid foam resin, in order to reduce consumption of the liquid foam resin and the weight of the skin covered foamed plastic article.

Also, when the skin covered foamed plastic article is to be used as a seat back, it is necessary to make a head rest stay on the skin covered foamed plastic article. For this purpose, as shown in FIG. 1, in a conventional mold 1 comprising a lower mold 2, an upper mold 3, and a middle mold 4, a protrusion 5 for making the head rest stay is provided on the lower mold 2 or the middle mold 4.

Now, in such a conventional mold 1, the middle mold 4 is attached to the lower mold 2 and after the manufacturing is completed the middle mold 4 has to be removed from the lower mold 2 in order to take the manufactured skin covered foamed plastic article out. Thus, the attaching and removing of the middle mold 4 have to be performed for each skin covered foamed plastic article to be manufactured, which is quite cumbersome.

On the other hand, the middle mold 4 could not have been combined with the upper mold 3 in order to eliminate this attaching and removing of the middle mold 4, because of the danger of damaging the manufactured skin covered foamed plastic article by the protrusion 5 in disassembling the upper mold 3 from the lower mold 2.

SUMMARY OF THE INVENTION

It is therefore an object of the present invention to provide a mold for manufacturing a skin covered foamed plastic article in which the middle mold is to be attached to the upper mold so as to eliminate the attaching and removing of the middle mold for each manufacturing cycle, without creating a danger of damaging the manufactured skin covered foamed plastic article when the upper mold with the middle mold attached is disassembled from the lower mold.

This object is achieved in the present invention by providing a mold for manufacturing a skin covered foamed plastic article comprising a pad member covered by a skin cover, comprising a lower mold having a molding surface over which the skin cover is to be placed; an upper mold to be assembled with the lower mold so as to form a cavity between the upper mold and the lower mold over the molding surface of the lower mold into which liquid foam resin to become the pad member is to be poured; a middle mold to be placed between the upper mold and the lower mold and to be attached to the upper mold such that when the upper mold is lifted upwards in order to be disassembled from the lower mold, the middle mold also moves upwardly and the skin covered foamed plastic article is taken out from the lower mold by the upper mold and the middle mold; and a protrusion for making a hole on the skin covered foamed plastic article to be manufactured, to be attached to the molding surface of the lower mold, which is freely detachable from the lower mold such that when the upper mold is disassembled from the lower mold, the protrusion is taken off the lower mold along with the skin covered foamed plastic article.

Other features and advantages of the present invention will become apparent from the following description taken in conjunction with the accompanying drawings.

BRIEF DESCRIPTION OF THE DRAWINGS

FIG. 1 is a cross sectional view of a conventional mold for manufacturing a skin covered foamed plastic article.

FIG. 2 is a cross sectional view of one embodiment of a mold for manufacturing a skin covered foamed plastic article according to the present invention.

DETAILED DESCRIPTION OF THE PREFERRED EMBODIMENT

Figure 3:
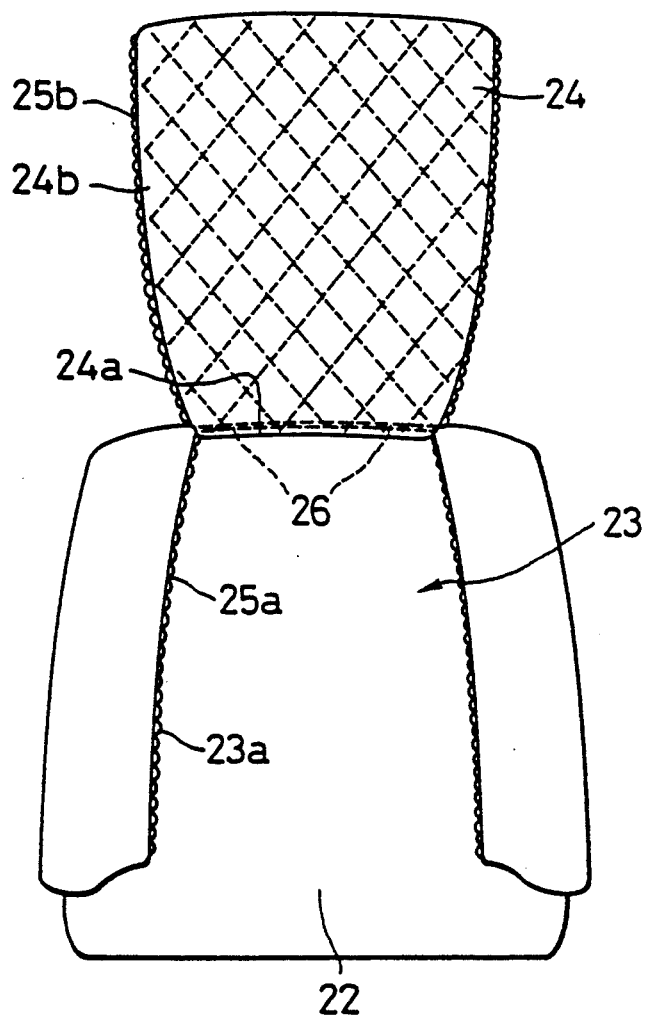
FIG. 3 is a perspective view of a skin cover for the skin covered foamed plastic article to be manufactured by the mold of FIG. 2.

Referring now to FIG. 2 there is shown one embodiment of a mold for manufacturing a skin covered foam plastic article according to the present invention.

In this embodiment, the mold 11 comprises a lower mold 12, an upper mold 13 to be assembled with the lower mold 12, and a middle mold 14 to be attached to the upper mold 13.

The lower mold 12 has a receiving hole portion 12a on one side wall, to which there is attached a protrusion 16 which can freely be detached from the lower mold 12. This protrusion 16 comprises a shaping portion 16a which has a shape corresponding to a head rest stay to be made on the skin covered foamed plastic article which is to be used as a seat back and a pin portion 16b to be inserted into the receiving hole portion 12a of the lower mold 12 when the protrusion 16 is to be attached to the lower mold 12. The pin portion 16b and the receiving hole portion 12a may be interchanged.

The middle mold 14 is attached to the upper mold 13 in a vertically movable manner. That is, there is a pair of vertically projecting rods 14a having stoppers 14b at their ends provided on a top face of the middle mold 14, which pierce through a pair of holes 13a provided on a top face of the upper mold 13. Thus, the middle mold 14 is vertically movable as the pair of rods 14a slide through the pair of holes 13a, for a length L of the rods 14a.

The middle mold 14 also has on one side wall a protruding portion 14c to be continuously connected with the protrusion 16 which together make the head rest stay on the skin covered foamed plastic article. The middle mold 14 also has on the opposite side wall a receiving portion 14d located beneath an opening 13b of the upper mold 13 from which liquid foam resin to become a pad member of the skin covered foamed plastic article is to be poured such that when the liquid foam resin is poured from this opening 13b the liquid foam resin hits the receiving portion 14d of the middle mold 14 first and then flows further down through a path 15 formed between the upper mold 13 and the middle mold 14, so as to reduce the pressure exerted on the skin cover to be placed over the lower mold 12. Also, the path 15 is formed to be sufficiently narrow to limit the amount of flow of the liquid foam resin, so as to reduce the pressure exerted by the falling liquid foam resin on the skin cover to be placed over the lower mold 12.

The lower mold 12 also has a container portion 12b next to the one side wall to which the protrusion 16 is attached, for placing the back side cover for the skin covered foamed plastic article while a skin cover for the skin covered foamed plastic article is placed over the lower mold 12.

As shown in FIG. 3, the skin cover 22 has an open back side 23 corresponding to a back side of the skin covered foamed plastic article to be manufactured, and the back side cover 24 is attached at one side 24a of the open back side 23, with a pair of holes 26 provided on this one side 24a. In addition, remaining circumferences 23a and 24b of the open back side 23 and the back side cover 24, respectively, are equipped with fasteners 25a and 25b, respectively, by means of which the back side cover 24 can be completely attached to the skin cover 22. These fasteners 25a and 25b may be replaced by other means for attaching one thing to another.

Figure 4:
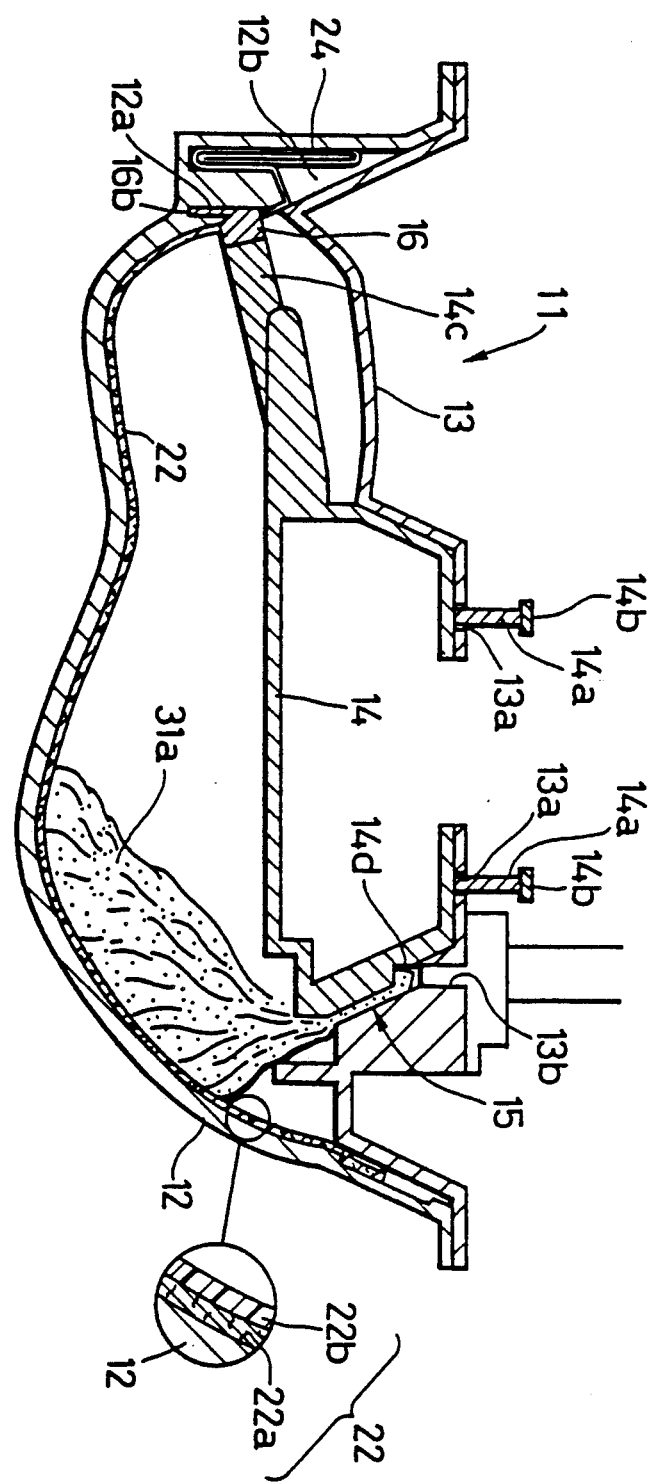
FIG. 4 is a cross sectional view of the mold of FIG. 2 at one stage in the manufacturing process.

Also, as shown in FIG. 4, the skin cover 22 to be placed over the lower mold 12 comprises a surface skin 22a and a wadding 22b to be attached on a back of the surface skin 22a, whereas the back side cover 24 is made of a single synthetic resin sheet. The back side cover 24 may be made of the same material as the skin cover 22.

The skin covered foamed plastic article, which in this example is that to be used as a car seat back, is manufactured by this mold as follows.

First, as shown in FIG. 4, the skin cover 22 is placed over a molding surface of the lower mold 12, with the attached back side cover 24 placed inside the container portion 12b of the lower mold 12. Here, the protrusion 16 attached on the lower mold 12 is pierced through one of the pair of holes 26 on the skin cover 22.

Then, the upper mold 13 and the middle mold 14 attached to the upper mold 13 are assembled with the lower mold 12, such that one end portion of the upper mold 12 closes the top of the container portion 12b of the lower mold 12, and that a cavity into which the liquid foam resin 31a is to be poured is formed between the lower mold 12 and the upper mold 13. If a seat back frame is to be incorporated in the skin covered foamed plastic article, the seat frame is also attached at this point.

Figure 5:
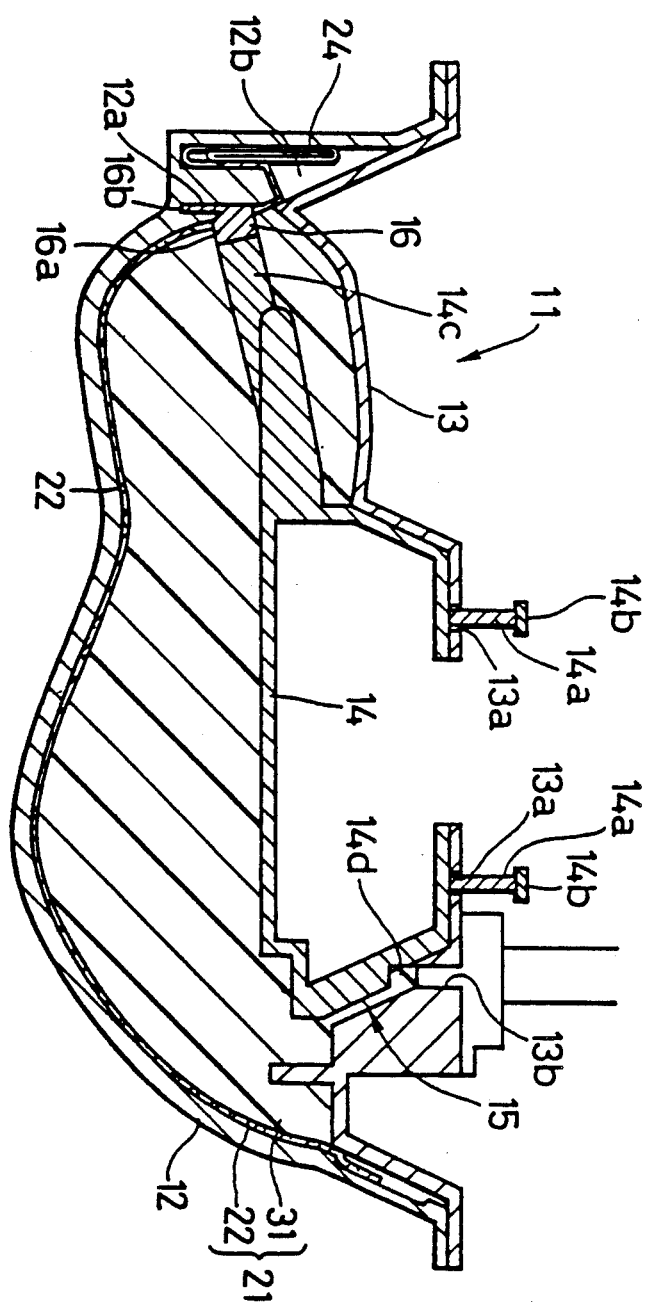
FIG. 5 is a cross sectional view of the mold of FIG. 2 at another stage in the manufacturing process.

Then, the liquid foam resin 31a is poured into the cavity from the opening 13b on the upper mold 13, so as to obtain a skin covered foamed plastic article 21 comprising the skin cover 22 and a pad member 31 combined together, as shown in FIG. 5.

Figure 6:
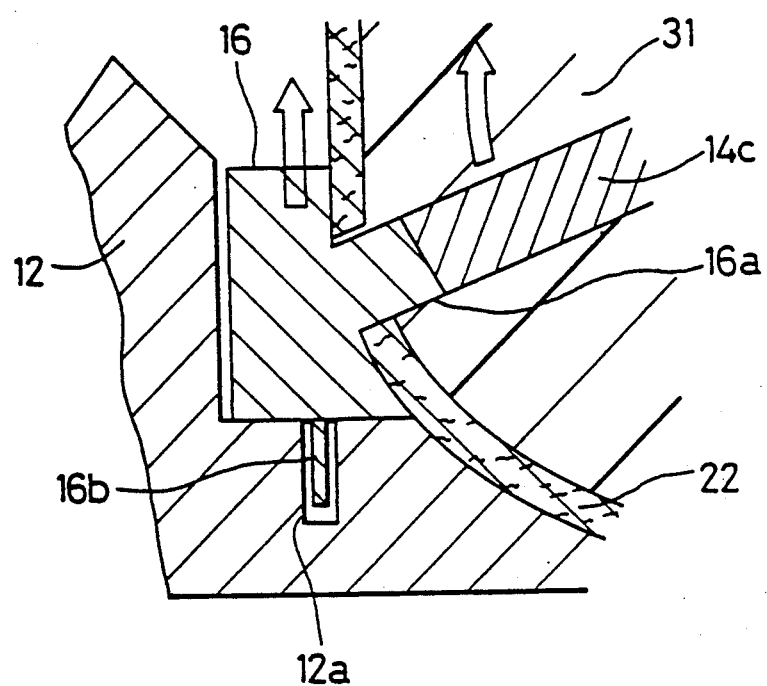
FIG. 6 is an enlarged partial cross sectional view of a protrusion to be provided on the mold of FIG. 2.

Next, the upper mold 13 is disassembled from the lower mold 12. Here, the middle mold 14 does not move until the upper mold 13 is lifted upwardly by the length L. When the upper mold 13 is lifted beyond the length L, the stoppers 14b of the rods 14a hit the top face of the upper mold 13 so that the middle mold 14 moves with the upper mold 13, and along with the upper mold 13 and the middle mold 14, the manufactured skin covered foamed plastic article 21 as well as the protrusion 16 are lifted upwards, as indicated by arrows in FIG. 6. The protrusion 16 is then removed from the skin covered foamed plastic article 21, and the skin covered foamed plastic article 21 is separated from the middle mold 14. Finally, the fasteners 25a and 25b are fastened together so as to attach the back side cover 24 with the skin cover 22 completely.

Thus, according to this embodiment, because the middle mold 14 is attached to the upper mold 13 and the protrusion 16 is detachably attached to the lower mold 12, the middle mold 14 moves along with the upper mold 13 when the upper mold 13 is disassembled from the lower mold 12, and at the same time the skin covered foamed plastic article 21 is taken out from the lower mold 12, so that it is possible to eliminate the attaching and removing of the middle mold 14 for each manufacturing cycle, without creating a danger of damaging the manufactured skin covered foamed plastic article 21 when the upper mold 13 with the middle mold 14 attached is disassembled from the lower mold 12.

It is to be noted that many modifications and variations of the above embodiments may be made without departing from the novel and advantageous features of the present invention. Accordingly, all such modifications and variations are intended to be included within the scope of the appended claims.

What is claimed is:

1. A mold for manufacturing a skin covered foamed plastic article comprising a pad member covered by a skin cover, comprising:

a lower mold having a molding surface over which the skin cover is to be placed;

an upper mold to be assembled with the lower mold to form a cavity between the upper mold and the lower mold over the molding surface of the lower mold into which liquid foam resin to become the pad member is to be poured;

a middle mold to be placed between the upper mold and the lower mold and attached to the upper mold, the middle mold being movable upwards together with the upper mold when the upper mold is lifted upwards in order to be disassembled from the lower mold, wherein the skin covered foamed plastic article is taken out from the lower mold by lifting the upper mold and the middle mold upwards; and a protrusion for making a hole in the skin covered foamed plastic article to be manufactured, to be attached to the molding surface of the lower mold, which is freely detachable from the lower mold when the upper mold is disassembled from the lower mold to remove the skin covered foamed plastic article.

2. The mold of claim 1, wherein the middle mold and the upper mold are relatively movable in a vertical direction for a predetermined length.

3. A mold for manufacturing a skin covered foamed plastic article including a pad member covered by a skin cover, comprising:

a lower mold having a molding surface for receiving the skin cover;

an upper mold for assembly with the lower mold to form a cavity between the upper mold and the lower mold and over the molding surface of the lower mold, for receiving a liquid foam resin for forming the pad member;

a middle mold for placement between the upper mold and the lower mold;

means attaching the middle mold to the upper mold for moving the middle mold upwardly, and for removing the skin covered foamed plastic article from the lower mold when the upper mold is lifted upwardly for disassembly from the lower mold; and a protrusion for forming a hole in the skin covered foamed plastic article to be manufactured, releasably attached to the molding surface of the lower mold and freely detachable from the molding surface of the lower mold when the upper mold is disassembled from the lower mold, so that the protrusion is removed from the lower mold together with the skin covered foamed plastic article.

4. The mold of claim 3, wherein the middle mold and the upper mold are movable relative to one another for a predetermined distance.

5. The mold of claim 4, wherein the middle mold includes a plurality of rods extending therefrom and slidingly received by a corresponding plurality of holes formed in the upper mold.

6. The mold of claim 5, wherein the plurality of rods terminate at a plurality of stoppers for limiting movement of the upper mold relative to the middle mold.

7. The mold of claim 3, wherein the protrusion includes a shaping portion for forming the hole in the skin covered foamed plastic article, and a pin portion extending from the shaping portion for slidingly engaging a receiving hole formed in the molding surface.

* * * * *